(12) United States Patent
Bahnck et al.

(10) Patent No.: US 10,346,595 B2
(45) Date of Patent: Jul. 9, 2019

(54) SYSTEM AND APPARATUS FOR FAULT-TOLERANT CONFIGURATION AND ORCHESTRATION AMONG MULTIPLE DRM SYSTEMS

(71) Applicant: ARRIS Enterprises, Inc., Suwanee, GA (US)

(72) Inventors: Thomas J. Bahnck, Lafayette Hill, PA (US); Preeti Tailor, Chalfont, PA (US); Francis A. Hinchey, Jr., Jenkintown, PA (US); Ellen Osis, West Chester, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/722,205

(22) Filed: May 27, 2015

(65) Prior Publication Data

US 2015/0347721 A1    Dec. 3, 2015

Related U.S. Application Data

(60) Provisional application No. 62/003,531, filed on May 27, 2014.

(51) Int. Cl.
*G06F 21/10*    (2013.01)
*G06F 9/44*    (2018.01)

(52) U.S. Cl.
CPC ............ *G06F 21/105* (2013.01); *G06F 21/10* (2013.01)

(58) Field of Classification Search
CPC ............... H04L 9/00; H04L 9/32–3297; H04L 63/04–0492; H04L 63/08–0892; G06F 15/16–18; G06F 21/00; G06F 21/30–46; G06F 21/60–645; G06F 2221/033;
(Continued)

(56) References Cited

U.S. PATENT DOCUMENTS

| 8,893,299 B1* | 11/2014 | Diamond | ............... G06F 21/10 705/51 |
| 2004/0128499 A1* | 7/2004 | Peterka | ............... H04L 63/062 713/155 |

(Continued)

OTHER PUBLICATIONS

"Verimatrix MultiRights: Dialing in Unified Revenue Security for Multi-network Video Services", Verimatrix, Inc., as downloaded from webpage; http://www.verimatrix.com/solutions/verimatrix-multirights, Jul. 24, 2015.

*Primary Examiner* — Ashokkumar B Patel
*Assistant Examiner* — Quazi Farooqui
(74) *Attorney, Agent, or Firm* — Carol J. Ansley

(57) ABSTRACT

A method of updating a common provisioning system (CPS) service is provided that includes: selecting a DRM service level from a DRM provider and a corresponding CPS service for said DRM service level; determining if the CPS service is associated with one or more CPS packages; for each associated CPS package, determining if the association is in a corrupt state, wherein the association is in a corrupt state if at least one package content collection (PCC) for the CPS package does not correctly include or exclude the DRM service level that corresponds to said CPS service; and for each associated CPS package in a non-corrupt state, updating a package content collection (PCC) in the DRM provider.

15 Claims, 12 Drawing Sheets

(58) Field of Classification Search
CPC ... G06F 9/00; G06F 21/10; G06F 9/44; G06F 21/105; G06F 8/70; H04N 7/16
USPC .................................. 726/26–28, 31, 32, 33
See application file for complete search history.

(56) References Cited

U.S. PATENT DOCUMENTS

| | | | |
|---|---|---|---|
| 2010/0211968 A1* | 8/2010 | Itskov .............. | H04N 21/41407 725/25 |
| 2013/0167253 A1* | 6/2013 | Seleznev ................ | G06F 21/10 726/29 |
| 2013/0326577 A1 | 12/2013 | Bahnck | |

* cited by examiner

SYSTEM AND APPARATUS FOR FAULT-TOLERANT CONFIGURATION AND ORCHESTRATION AMONG MULTIPLE DRM SYSTEMS

CROSS-REFERENCES TO RELATED APPLICATIONS

The present disclosure claims priority to U.S. Provisional App. No. 62/003,531, entitled "System and Apparatus for Fault-Tolerant Content Configuration and Orchestration Among Multiple DRM Systems", filed May 27, 2014, the contents of which is incorporated herein by reference in its entirety.

BACKGROUND

Multiple system operators (MSOs) are now offering over-the-top (OTT) services that deliver video to various devices. For example, video can be delivered to smartphones, personal computers, laptops, and tablet devices. This is in addition to delivering the content traditionally through a cable network (or other networks) to a television. Content providers provide the content to the MSOs, which operate multiple systems. For example, the MSO may operate different systems that can provide content through the cable network and/or the Internet. The MSO may provide the OTT services through the Internet.

By providing over-the-top services, different devices may be used by users. For example, previously, set top boxes were used to receive and output the content on just televisions. However, when using over-the-top services, a disparate set of devices may be used by households. For example, one household may include a smartphone of a first type and another household may include a smartphone of a second type and also a tablet computer. This makes it hard to isolate and control any content restrictions requested by the content providers and provided by digital rights management (DRM). For example, a content provider may want to restrict a TV show from being played on a certain type of device, such as a TV show should not be played on smartphones. As used hereinafter, MSOs implementing access control (e.g., DRM control) may utilize various products from DRM providers to effect said access control. It can be appreciated that MSOs desire to procure multiple DRM systems for various cost control reasons, but that there is an operational burden or complexity inherent to operating multiple DRM providers simultaneously.

Consequently, the use of a common provisioning system (CPS) to centrally control content configuration and device authorizations for all DRM providers is desirable. Use of such CPS allows content protected by multiple DRM providers to be addressable at a single point. This CPS can address and alleviate deficiencies noted for MSOs.

SUMMARY

In one embodiment of the present invention, a method of updating a common provisioning system (CPS) service is provided that includes: selecting a DRM service level from a DRM provider and a corresponding CPS service for said DRM service level; determining if the CPS service is associated with one or more CPS packages; for each associated CPS package, determining if the association is in a corrupt state, wherein the association is in a corrupt state if at least one package content collection (PCC) for the CPS package does not correctly include or exclude the DRM service level that corresponds to said CPS service; and for each associated CPS package in a non-corrupt state, updating a package content collection (PCC) in the DRM provider.

In another embodiment, a method of updating a common provisioning system (CPS) service with a CPS package, includes: selecting a CPS service and CPS package to update; determining if one or more digital rights management (DRM) service levels are mapped to the CPS service; and for each package content collection (PCC) in a DRM provider corresponding to the CPS package, updating each PCC to include the same information as the CPS package it corresponds to.

The following detailed description and accompanying drawings provide a better understanding of the nature and advantages of particular embodiments.

DETAILED DESCRIPTION

Described herein are systems and methods that use a common provisioning system (CPS) to centrally control content configuration and device authorizations for all DRM providers. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
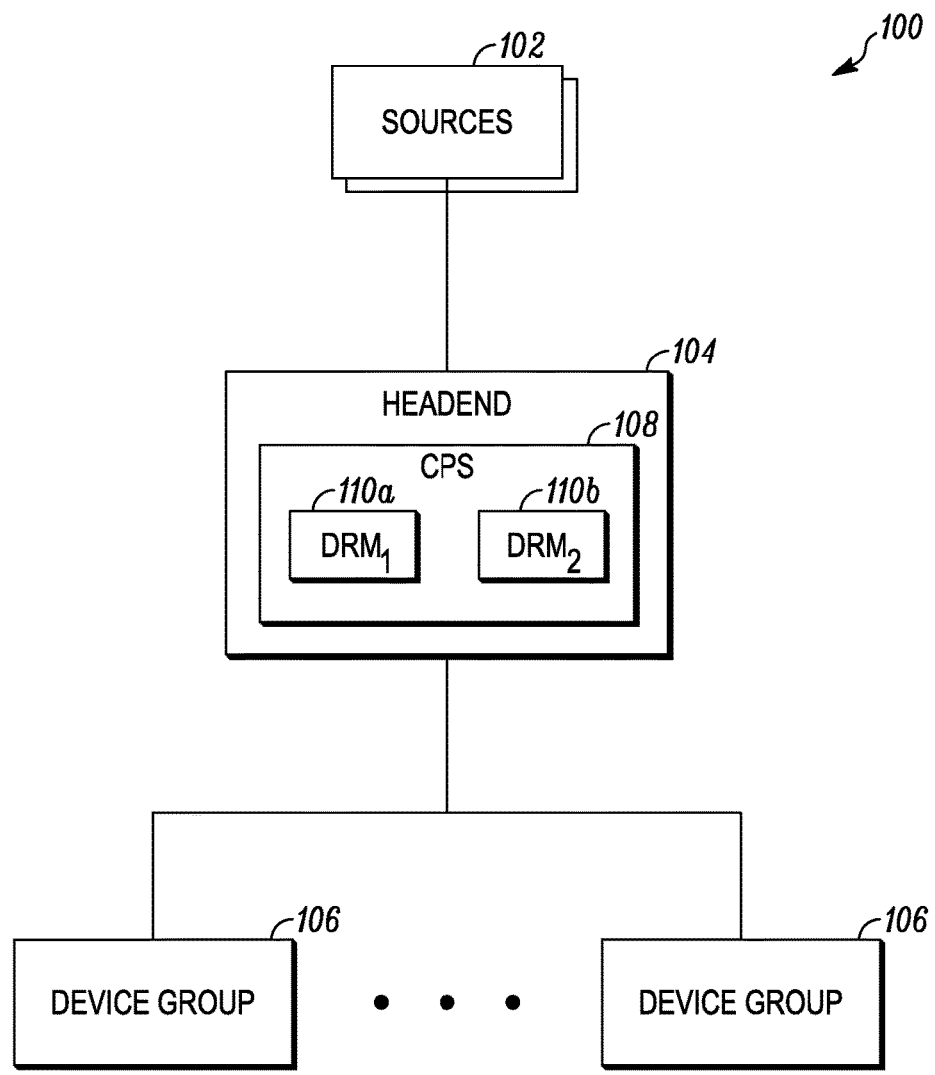
FIG. 1 depicts an example of a system for controlling content authorization according to one embodiment.

FIG. 1 depicts an example of a system 100 for controlling content authorization according to one embodiment. System 100 includes sources 102, a head-end system 104, and device groups 106. An MSO may be associated with head-end system 104, which may provide content to devices in device groups 106. For example, head-end 104 provides video through an over-the-top (OTT) service. The over-the-top service provides services via different delivery mechanisms. For example, traditional service delivery may be through a cable network to a set-top box. The OTT service delivery may deliver content through the Internet, such as through hypertext transfer protocol (HTTP) live streaming (HLS) and video-on-demand (VOD). The OTT service delivery may stream content or may provide a file download with progressive playback.

Device groups 106 may include a variety of heterogeneous devices, such as cellular phones, smartphones, tablet devices, personal computers, and laptop computers that can play content. In one embodiment, a device group 106 is associated with a discrete entity, such as a household account, which may be a grouping used by the MSO for accounting purposes. Also, the devices in device group 106 may be heterogeneous devices in that they may be associated with different configurations. For example, smartphones include smaller screens than tablet devices. In some cases, a content provider may not want content displayed on smartphones because the content provider may not think the content is properly viewed on the smaller screen. However, the content provider may allow the content to be viewed on tablet devices. Because different households may include different devices, particular embodiments are used to restrict content authorization on other devices in device groups 106.

In some embodiments, an MSO will procure a common provisioning system (CPS) for operational efficiency. The CPS may act as an intermediary between the MSO and one or more DRM providers, with built-in support for the DRM providers. This may allow the MSO to integrate once (to the CPS) rather than multiple times for each DRM provider. As shown, a CPS 108 may centrally control content configuration and device authorizations for all DRM providers, such as $DRM_1$ 110a and $DRM_2$ 110b. As is known, a DRM provider is used to restrict content access. For example, content access may be restricted by configuring settings in DRM providers. Thus, CPS 108 may be used to restrict content access on devices in device groups 106.

In some embodiments, CPS 108 is a single product, system, or service platform, allowing content protected by multiple DRM providers, $DRM_1$ 110a and $DRM_2$ 110b, to be addressable at a single point. A more in-depth view of CPS 108 is provided in FIGS. 3 and 5. As used herein, content configuration refers to service definition, package definition, service association to package(s), and/or command/control of DRM providers such that the content model and device authorizations defined in the CPS are enforceable. A service can be linear or a Video On-Demand (VOD) asset. A package can consist of linear services and/or VOD assets.

In some embodiments, asynchronous and/or independent operations with the DRM providers may be required to create and maintain content models in the DRM providers, which correspond to the content models in CPS 108. Such operations may include:

Create, read, update, or delete DRM service tiers or levels (e.g., bands or events).

Create, read, update, or delete DRM content collections (e.g., bundles or packages).

As used herein, content collections are groups of service tiers, which are collectively addressable. For example, when a device is authorized for a content collection consisting of service tier or collection 1 and service tier or collection 2, it is authorized for both service tiers or collections 1 and 2.

When the content model in the CPS is changed, many requisite operations with the DRM providers may be necessary. If one or more operations fail, the content model may be incorrectly configured in the DRM providers, leaving the MSO at risk of unintentionally authorizing a subscriber for unpaid/unwanted content, or failing to authorize a subscriber for purchased/wanted content. For example, a content collection may incorrectly omit a service tier, or include extraneous service tiers.

In some embodiments, CPS 108 may additionally include business or policy rules defined which restrict certain services from being authorized on certain devices, or types of devices (e.g. device group 106, etc.). These services may be contained in one or more packages. To enforce policy on devices authorized for these packages, CPS 108 may derive child packages from the original package, where necessary, which omit the services restricted on some devices due to policy. The child package(s) are then assigned to the affected device(s), instead of the original (e.g., root) package. The child packages may be hidden from (e.g., transparent to) the CPS user, Child packages and root packages are provided in more detail in FIG. 5.

Figure 2:
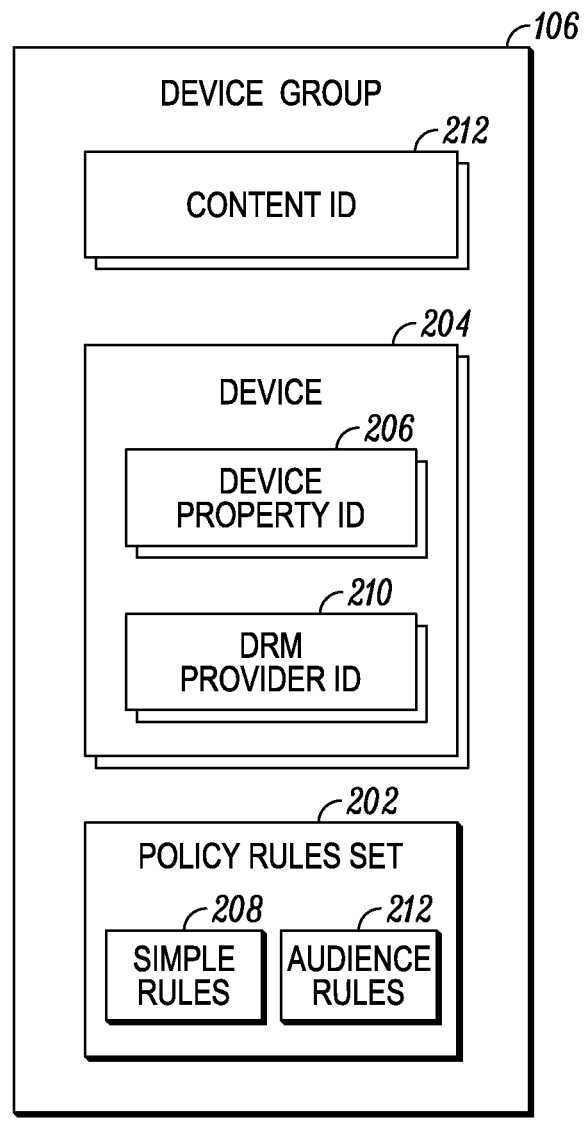
FIG. 2 depicts an example of a device group level having policy rules according to one embodiment.

FIG. 2 depicts an example of policy rules on the device group level according to one embodiment. The policy rules may only apply to devices and content authorizations associated with a device group 106. For example, the devices are the registered devices in a single device group 106, such as a household. The content authorizations are which content a device group 106, such as a household, is authorized to view. For example, a household may subscribe to HBO™.

Device group 106 includes content ID 212, which represents an authorization for content, such as a service, package, VOD asset, or other offering for the household. A device 204 represents a device that can receive content. For example, device 204 may be a customer premise equipment (CPE) device.

A device property ID 206 within each device 204 describes the device type. These are devices associated with a household. Device property ID 206 may refer to a type defined in system 100, which may be a make, model, OS, or other attribute.

A DRM provider ID 210 contains identifying data necessary to administer device 204 with its supported DRM systems, such as DRM providers $DRM_1$ 110a and $DRM_2$ 110b. For example, a given device 204 may support both SecureMedia and Widevine DRM. In this case, two DRM providers 110a and 110b are associated with device 204. Also, it will be understood that a company may provide many different types of DRM. DRM provider ID 210 may, but need not be, in a string format and correlates to DRM information associated with a device 204. For example, DRM provider data may include a unique device ID 210, key information, activation information, registration data, or other data.

Policy rules set 202 may be associated with device group 106. These are the different policy rules that apply to a specific device group 106. For example, policy rule set 202 may include simple rules 208 and audience rules 212. Simple rules 208 may be rules that are not directed to an audience. For example, simple rules 208 are not dependent on device properties or content authorizations. In one example, a rule 208 may state "a maximum number of devices allowed per device group is 5".

An audience rule 212 describes a subset of a viewing population. For example, the audience may be "Droid™ phones watching HBO™", "Droid3s watching HBO™ or Cinemax", "Droid3s watching anything", "Droid3s using PlayReady DRM", or "HBO™ and Cinemax" on any device". When coupled with a directive (not shown), a policy rule is formed. For example, the policy rule may be "Disallow HBO' on Droid phones", Cinemax on Droid3s, and Showtime using PlayReady DRM". The directive may define a restriction, such as disallow or allow, that states the nature of the audience rule. A further discussion of policy rules can be found it U.S. Patent Publication No. US20130326577 filed May 31, 2012, and incorporated herein by reference in its entirety.

Policy rules may be set up on the device group level and system level. The policy rules set may be associated with a system, a device group, or both. Rules in a device group may override rules at the system level if rules conflict.

Figure 3:
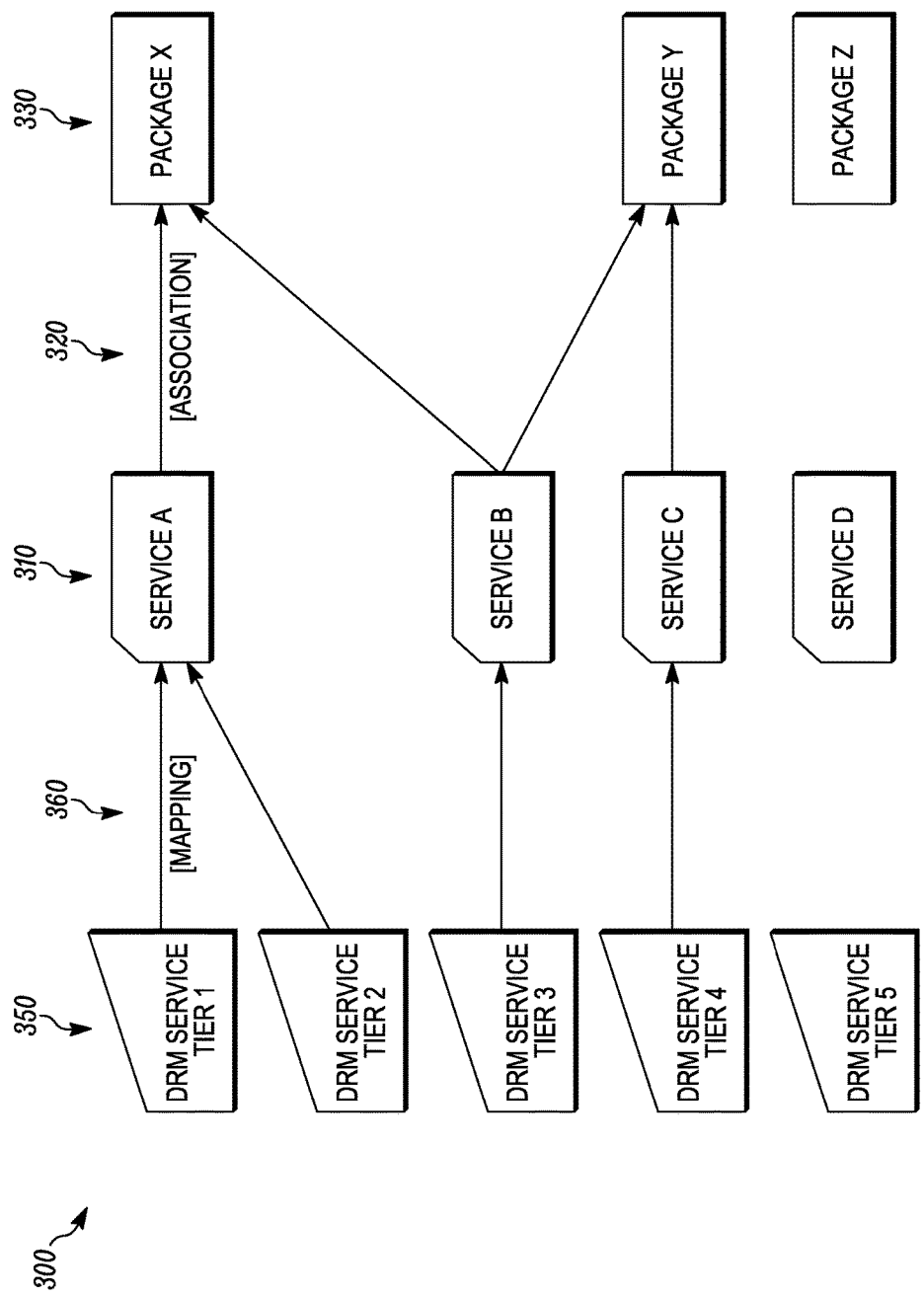
FIG. 3 depicts an example of a CPS content model according to one embodiment.

FIG. 3 depicts an example of a CPS content model 300 according to one embodiment. As shown, CPS content model 300 includes the following content entities and relationships among them: services 310, packages 330 and service associations to packages 320. Services 310 may represent a program or VOD asset, e.g., ABC, Breaking Bad Season 1 Episode 1, etc. Packages 330 may represent a collection of services, e.g., Premium, Sports, etc. Service associations to packages 320 may represent an assignment of a service to a package, e.g., in the inclusion of HBO™ in the Premium package.

Also shown in FIG. 3 are DRM service tiers or collections 350. As used herein, a DRM service level 350 is a construct in a DRM provider that protects content (e.g., in SecureMedia it is a band; in Verimatrix it is an event). More specifically, a DRM service level 350 represents an encrypted video or transport stream, including cryptographic data that represents an access-controlled service. A service collection 350 may be used to protect either linear or on-demand content. A service 310 can have 0 or more DRM service levels 350 mapped 360 to it. A package 330 can include 0 or more services 310. A service 310 can be associated 320 with 0 or more packages 330. It should be appreciated that it is not necessary for a DRM service level 350 to be mapped to a service 310, or for a package 330 to include any services.

Figure 4:
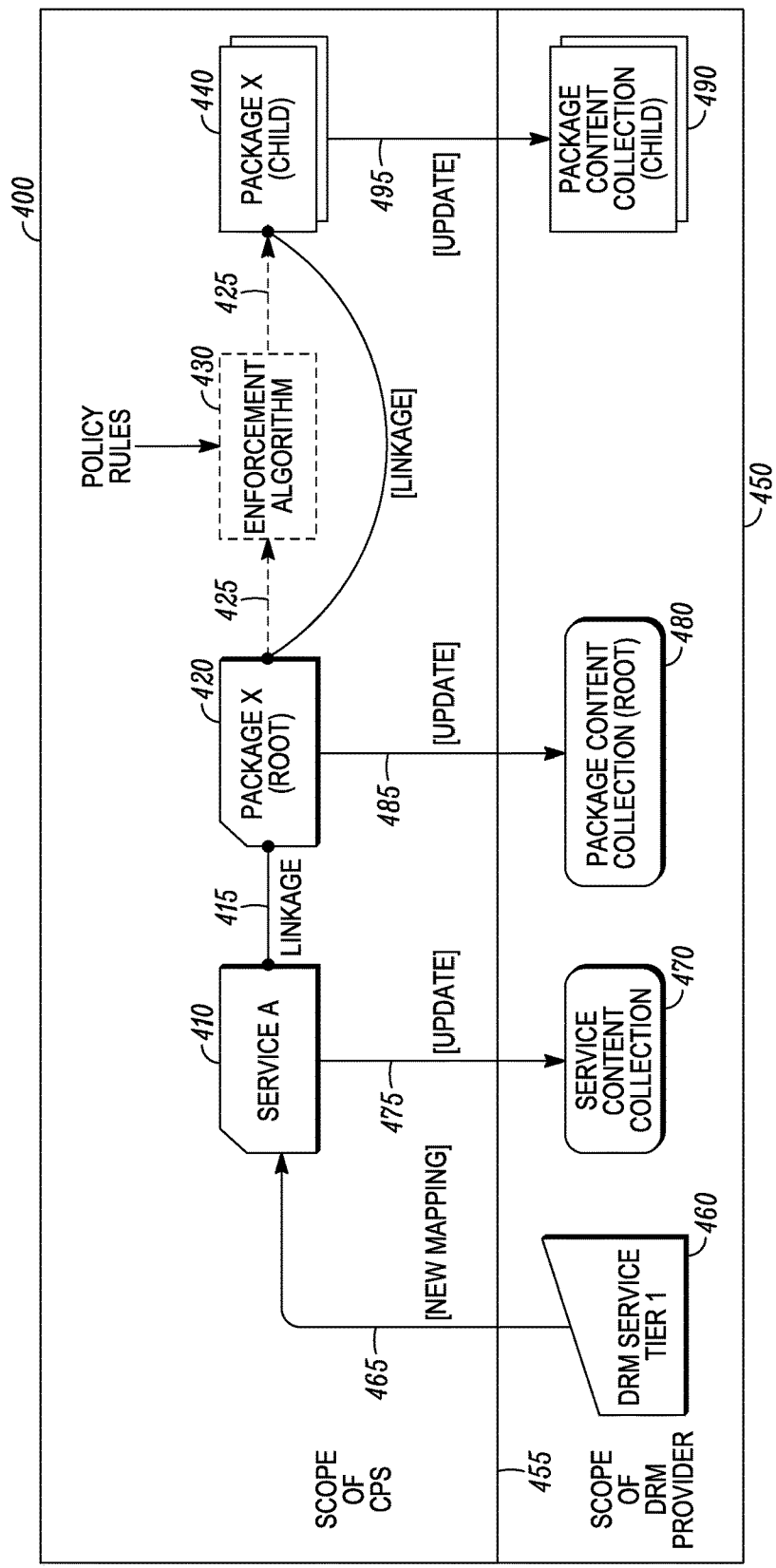
FIG. 4 depicts an example of an overview showing the relationship between a DRM service tier or level and a CPS service according to one embodiment.

FIG. 4 depicts an example of an overview showing the relationship between a DRM service tier or level 460 and a CPS service 410 according to one embodiment. As shown, the scope of a CPS 400 includes a CPS service 410, a root package 420, an optional enforcement algorithm 430, and a child package 440. The scope of a DRM provider 450 includes a DRM service level 460, a service content collection (SCC) 470, a root package content collection (PCC) 480, and a child package content collection (PCC) 490. The scope of the CPS 400 is separated from the scope of the DRM provider 450 by line 455.

As provided in the discussion of FIG. 2, the CPS may include policy rules defined (via enforcement algorithm 430) which restrict certain services from being authorized on certain devices, or types of devices (e.g. tablets, smartphones, etc.). These services may be contained in one or more packages. To enforce policy on devices authorized for these packages, the CPS may derive one or more child packages 440 from the original or root package 420, which omit the services restricted on some devices due to policy.

As used herein, a content collection is a construct in a DRM provider, which a device can be directly authorized for (e.g., in SecureMedia it is a bundle; in Verimatrix it is a package). A content collection can include 0 or more service tiers, and can include mixed linear and/or on-demand content. A content collection, which corresponds to CPS service 410, is referred to as service content collection (SCC) 470. A content collection which corresponds to CPS root package 420 is referred to as root package content collection (PCC) and a content collection which corresponds to CPS child package 440 is referred to as child package content collection (PCC) 490. In some embodiments, a DRM provider may allow a device to be directly authorized for a DRM service level 460, as well as or instead of a content collection.

In some embodiments, CPS service 410, root package 420, an optional enforcement algorithm 430, and child package 440 and their relationships to each other (linkages 415 and 425) are stored in the CPS. Additionally, in some embodiments, the relationships between the CPS and content collections (e.g., to SCC 470 and PCCs 480, 490 via links 475 and 485, 495, respectively) are also stored in the CPS. The DRM service level 460, SCC 470, root PCC 480, and PCC 490 are stored in the DRM provider.

Still referring to FIG. 4, when a content model in the CPS is changed or updated (e.g., a service may be added/deleted, a package may be added/deleted, a service association to a package may be added/deleted, a DRM may be mapped/unmapped from a service, etc.), the CPS initiates a series of operations with the DRM providers to correctly reflect the new content model. This process is known as fulfillment. For example, when a DRM service level is newly mapped to a CPS service, the CPS must update the corresponding SCC in all DRM providers under management, as well as all PCCs corresponding to all CPS packages containing the CPS service. Each of these transactions is atomic and independent of the others, leaving much room for disparity between the CPS and the DRM providers in the event of failed transactions.

For the example shown in FIG. 4, CPS Service A (e.g., CPS service 410) is associated with CPS Package X (e.g., root package 420), and per policy rules defined in the CPS, the CPS derived child packages for Package X (e.g., child package 440). Assuming that a new DRM Service Tier 1 (e.g., DRM service level 460) is mapped to CPS Service A (e.g., CPS service 410), via link 465. However, Service A is also associated with Package X, so in order to fulfill this change to the content model, the CPS initiates the following operations:

Update 475 the SCC 470 in the DRM which corresponds to CPS Service A 410;

Update 485 the PCC(s) 480 in the DRM which corresponds to root CPS Package X 420;

Update 495 the PCC(s) 490 in the DRM which correspond to child packages 440 derived from CPS Package X.

However, complications can arise because the update 475 of the SCC 470 may fail or the update 485, 495 of one or more PCCs 480, 490 may fail. An update 475 failure may result in device authorizations for Service A not having the intended effect. For example, the DRM client running in the device would not receive the new DRM service level 460. This problem would not, however, by itself, prevent devices that are authorized for Package X (e.g., via root package 420 or child package 440), and which include Service A from getting the new DRM service level.

An update 485, 495 failure may result in certain device authorizations for Package X not having the intended effect. Because, per policy rules, some devices may be authorized for the root PCC 480 and some may be authorized for one of the child PCCs 490 derived for Package X, some subset of the devices authorized for Package X may correctly receive the new DRM service level 460 and some may not.

Consequently, it is desirable for the CPS to take steps to minimize the possible error scenarios for content configuration, for system stability and operational clarity and restrict certain system operations when in error state, to keep device authorizations for content as accurate and predictable as possible.

Figure 5:
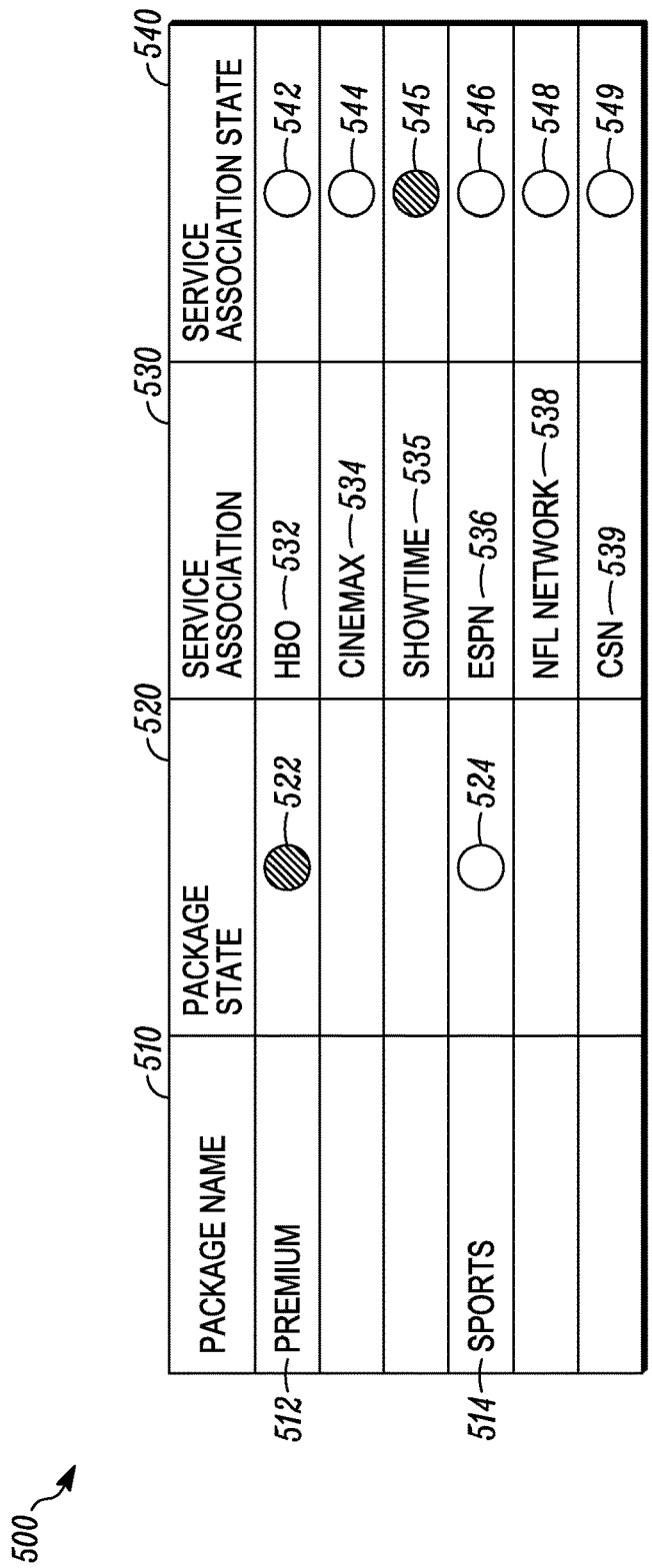
FIG. 5 depicts an example of a state chart showing the relationship between a package state, a service association, and a service association state according to one embodiment.

FIG. 5 depicts an example of a state chart 500 showing the relationship between a package state, a service association, and a service association state according to one embodiment. An overview of state chart 500 is that a normal or corrupt state is reported in the CPS for every service association to a package (service association state 540) and for every package (package state 520) defined. In the present example, the packages 510 include a premium package 512 and a sports package 514. The premium package 512 is associated with package state 522 and includes the service associations 530 HBO 532, Cinemax 534 and Showtime 535. Service associations 530 HBO 532, Cinemax 534 and Showtime 535 are associated with service association states 542, 544, and 545, respectively. The sports package 514 is associated with package state 524 and includes the service associations 530 ESPN 536, NFL Network 538 and CSN 539. Service associations 530 ESPN 536, NFL Network 538 and CSN 539 are associated with service association states 546, 548, and 549, respectively.

In order to have normal and corrupt states for (1) CPS service associations to CPS packages and (2) CPS packages, the normal and corrupt states are defined. As used herein, a service association to a package is "normal" when all PCCs (both root and child) that correspond to the package correctly include/exclude the DRM service level that is mapped to the service. In some embodiments, a package is normal when all of its associations to services are normal.

For example, referring briefly back to FIG. 4, assume that (1) no policy rules address CPS service A 310, (2) service 310 A is mapped 465 to DRM service level 1 460, and (3) service A 310 is associated 415 with CPS package X 420. The association 415 of (3) is considered "normal" if all PCCs 480 which correspond to package X 420 include DRM service level 1 460.

As another example, assume that (1) there is only one policy rule in the CPS and it prohibits service A 410 on certain devices, (2) service A 410 is mapped 465 to DRM service level 1 460, and (3) service A 410 is associated 425 with CPS package X 430. The association 425 of (3) is considered "normal" if the child PCC(s) 490 which correspond to package X 430 and were created to enforce the business rule of (1) exclude DRM service level 1 460, and all other PCCs 480 which correspond to package X 420 include DRM service level 1 460.

As used herein, a service association to a package is "corrupt" when at least 1 of the PCCs (either root or child) that correspond to the package does not correctly include/exclude the DRM service level that is mapped to the service. In some embodiments, a package is corrupt when at least 1 service association to it is corrupt.

For example, assume that (1) no policy rules address CPS service A 410, (2) service A 410 is mapped 465 to DRM service level 1 460, and (3) service A 410 is associated 415 with CPS package X 420. The association 415 of (3) is considered "corrupt" if at least one PCC 480 which corresponds to package X 420 does not include DRM service level 1 460.

As another example, assume that (1) there is only one policy rule in the CPS and it prohibits service A 410 on certain devices, (2) service A 410 is mapped 465 to DRM service level 1 460, and (3) service A 410 is associated 425 with CPS package X 430. The association 425 of (3) is considered "corrupt" if the child PCC(s) 490 which correspond to package X 440 and were created to enforce the business rule of (1) does not exclude DRM service level 1 460, or any other PCC 480 which corresponds to package X 420 does not include DRM service level 1 460.

Referring back to FIG. 5, a corrupt association of Showtime 535 to the premium package 512 (via corrupt service association state 545) is causing the premium package state 522 to be corrupt. The sports package state is showing a normal state because all service association states are normal.

A benefit of the present disclosure is that there is no need to manage a corrupt state for CPS services, only the packages associated with the services. As shown in FIGS. 6-9 and described in more detail below, the processes illustrate that transactions with the DRM provider(s) occur in a certain sequence such that a CPS service cannot be incorrectly represented in the DRM providers while CPS Packages remain correctly represented in the DRM providers. In other words, there cannot be a situation where the CPS indicates that there's no DRM associated with HBO, and yet, by virtue of HBO being in the premium package, when the subscriber is authorized for premium, he gets HBO. By preventing this error case, operational complexity is decreased and error scenarios are minimized for the MSO to mitigate.

The present disclosure provides a CPS content model that is updated (e.g., fulfillment) according to predetermined or specific sequences. Thus, operations with the corresponding or subscribing DRM provider(s) are executed in a specific order or follow a set of predetermined rules. A more in-depth description is provided in the discussion of FIGS. 6-12, however an overview of such predetermined rules is provided below.

In some embodiments, when an empty CPS service is defined (e.g., no DRM service level mapping yet), the corresponding SCCs are created in all configured DRM providers. At this point, the SCCs will not contain any service tiers. This step may ensure that later on, when a DRM service level is mapped to the CPS service, only one operation is required with a DRM provider to correctly configure the CPS service in the DRM (e.g., this operation simply updates the existing SCC to include the DRM service level, meaning that there is no need for an additional operation with the DRM to create the SCC itself).

However, in some embodiments, creation of the SCC itself may be initiated when a DRM service level is mapped to the CPS service. Similarly, deletion of the SCC itself may be initiated when a DRM service level is unmapped from the CPS service. A benefit of this embodiment is that empty content collections are not stored in the DRMs. If the SCC cannot be created at the time the CPS service is created, the action of creating the service in the CPS fails, and the content model in the CPS remains unchanged.

In some embodiments, when a DRM service level is mapped to a CPS service, the DRM service level is added to the corresponding SCC before adding it to the PCCs, which correspond to all CPS package(s) which contain this service. Furthermore, if the attempt to add the DRM service level to the SCC fails, the DRM service level is not added to any of the PCCs. This step may ensure that the CPS service is correctly configured before attempting to re-configure CPS packages which are associated with the service. In some embodiments, there may be one or more failures when attempting to update all of the PCCs which correspond to the affected CPS package(s), which would cause the CPS to report the package(s) as "corrupt". And without the CPS able to show the service collection which was mapped to the CPS service, whose association to the package is now corrupt due to one or more failures to update the PCCs, the operator cannot know what impact the corruption is having on devices in the field without more complex failure management measures.

In some embodiments, when a CPS service is deleted, the corresponding SCCs in all DRM providers under management are deleted. As used herein, "under management" means that the DRM provider's system is being controlled by the CPS. This step may ensure that empty content collections are not left in the DRM provider systems. If an attempt to delete an SCC fails, the CPS may reuse the same SCC if an identical service is defined again in the CPS in the future.

In some embodiments, when a DRM service level is unmapped from a CPS service, the DRM service level is removed from the PCCs which correspond to CPS package(s) which contain the CPS service, before removing the DRM service level from the SCC which corresponds to the service. Furthermore, if an attempt to remove the DRM service level from any requisite PCCs fails, the DRM service level is not removed from the SCC. Instead, this sequence of operations is aborted, causing the service's association to one or more packages to become corrupt, but leaving the SCC still correctly corresponding to the CPS service. This step may ensure that the CPS service retains the DRM service level that is mapped to it, until necessary to remove, such that if an attempt to remove the DRM service level from a PCC causes an associated CPS package to become "corrupt", the operator will be able to see the effect of the corruption by examining the DRM service levels still mapped to the CPS service.

In some embodiments, the present disclosure provides for restricting authorization operations on CPS packages in the corrupt state, as well as configuration changes to policy rules that address CPS services with a corrupt association to a CPS package. For example, devices may not be allowed to be newly authorized for a package in the corrupt state. The reason behind this restriction is that PCCs which correspond to the package in the DRM provider may contain more or fewer service tiers than intended; therefore, to authorize a device for the package may grant unpaid services to the subscriber, or fail to authorize the subscriber for purchased content.

As another example, the addition, deletion, or modification of policy rules that address a service with a corrupt association to a package may not be allowed. E.g., if policy rule Q disallows service "HBO" on tablets, and HBO has a corrupt association to Premium package, rule Q cannot be changed or deleted until the service association is corrected (e.g., made normal). Also, a new policy rule which addresses service HBO cannot be stored and enforced until the association of HBO to Premium is corrected. In other words, because the service may not be correctly authorized on all intended devices, due to a corrupt association with one or more packages, a change to the policy rule may leave some devices authorized for an unintended DRM service level, or fail to authorize certain device(s) for other DRM service levels.

In some embodiments, changes to the DRM service level mapping(s) to a CPS service while the service has a corrupt association to a CPS package are not allowed. Again, the rationale is, confusion would otherwise arise as to what DRM service level is involved with the corruption to the CPS package, versus the DRM service level presently shown as mapped to the CPS service associated with the package.

In some embodiments, when a CPS service has a corrupt association to a CPS package, the MSO may "force-disas- sociate" them, whereby the CPS only removes the association from its own content model, and no operations are initiated with the DRM providers to re-configure their corresponding content model. This step may address a scenario where there are operational hindrances between the CPS and the DRM provider systems, preventing the MSO from correcting the content corruption(s) in the usual manner, and the aforementioned system restrictions are preventing the MSO from carrying out business as usual. In this case, it is assumed that manual intervention directly in the DRM provider systems is required to coordinate the CPS content configuration with the DRM provider's content configuration.

Figure 6:
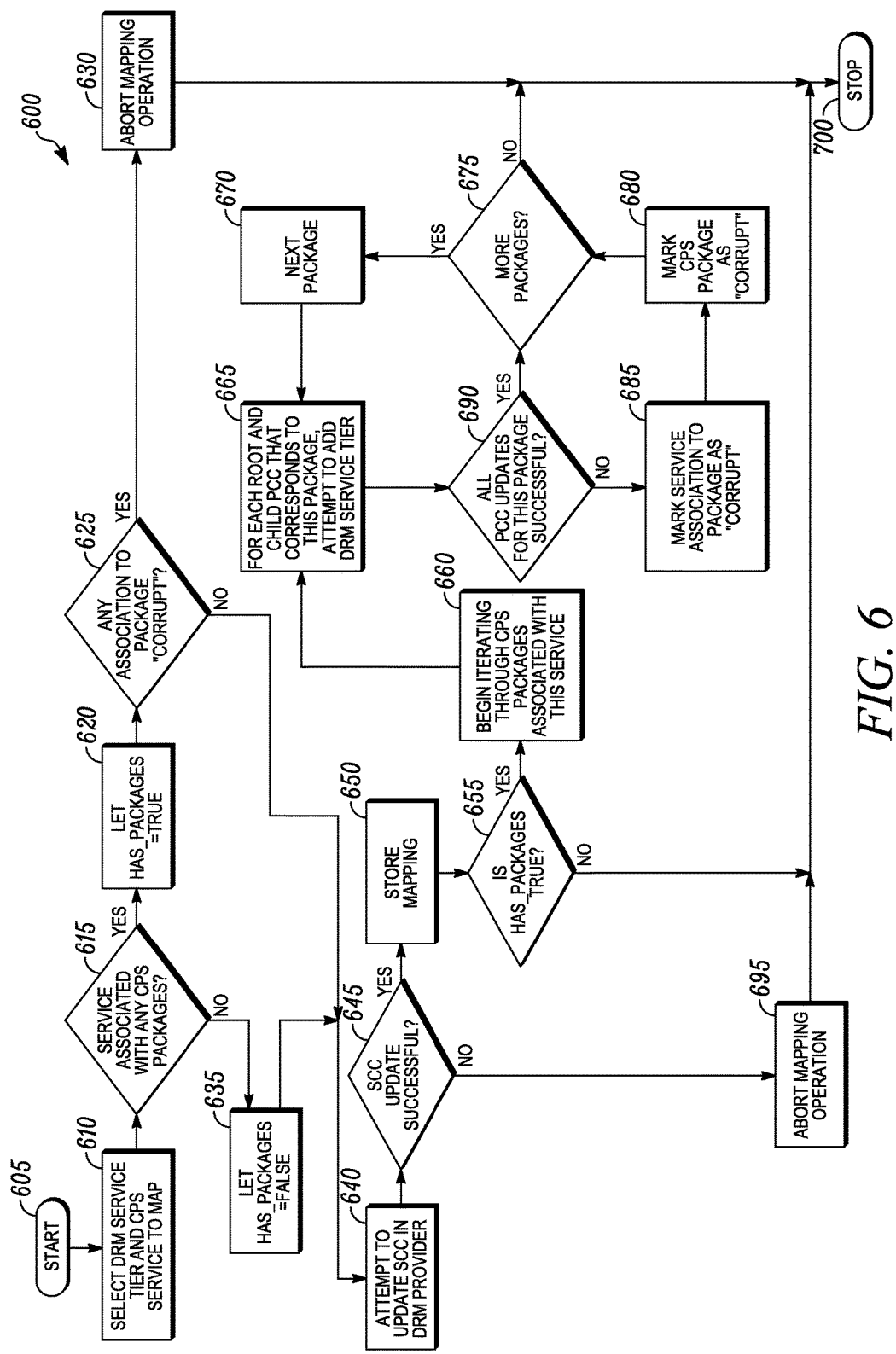
FIG. 6 depicts an example of mapping a DRM service tier or level to a CPS service according to one embodiment.

FIG. 6 depicts an example method 600 of mapping a DRM service level to a CPS service according to one embodiment. In a first step 605, process 600 is initiated. At step 610, a DRM service level and CPS service are selected to map. At step 615, it is determined if the CPS service is associated with any CPS packages. If not, at step 635, the CPS service is marked as not having any packages. Thereafter, in step 640, the CPS attempts to update the SCC in the DRM provider. At step 645, it is determined if the SCC update is successful. If successful, the SCC mapping of the DRM service level to the CPS service is stored in step 650. At step 655, it is determined if the CPS service is associated with any CPS packages. If the CPS service does not include any CPS packages, the process is terminated at step 700. If the CPS service does include CPS packages, then at step 660, the CPS begins iterating through CPS packages associated with the CPS service. At step 665, for each root and child PCC that corresponds to the CPS package, the CPS attempts to add the DRM service level to the root or child PCC. At step 690, if all PCC updates for the CPS package are successful, the CPS checks for more CPS packages at step 675. If there are no more CPS packages, the process is terminated at step 700. At step 690, if not all PCC updates for the CPS package are successful, the CPS marks the service association to the CPS package as corrupt at step 685. Thereafter, in step 680, the CPS marks the CPS package as corrupt. At step 675, the CPS checks for more CPS packages. If there are no more CPS packages, the process is terminated at step 700.

Referring back to step 615, if it is determined that the CPS service is associated with one or more CPS packages, at step 620, the CPS service is marked as having a package. At step 625, the CPS determines if any association to a CPS package is corrupt. If there are no corrupt associations, at step 640, the CPS attempts to update the SCC in the DRM provider. Thereafter, the sequence of steps after 640 may follow as described above.

If there are one or more corrupt associations between the CPS service and CPS packages, at step 630, the CPS aborts the mapping operation. Thereafter, the process is terminated at step 700.

In FIG. 6, the only action necessary to store a mapping is the successful update of the SCC. When attempts to update PCCs are unsuccessful, they result in a corrupt association to the service; the mapping remains.

Figure 7:
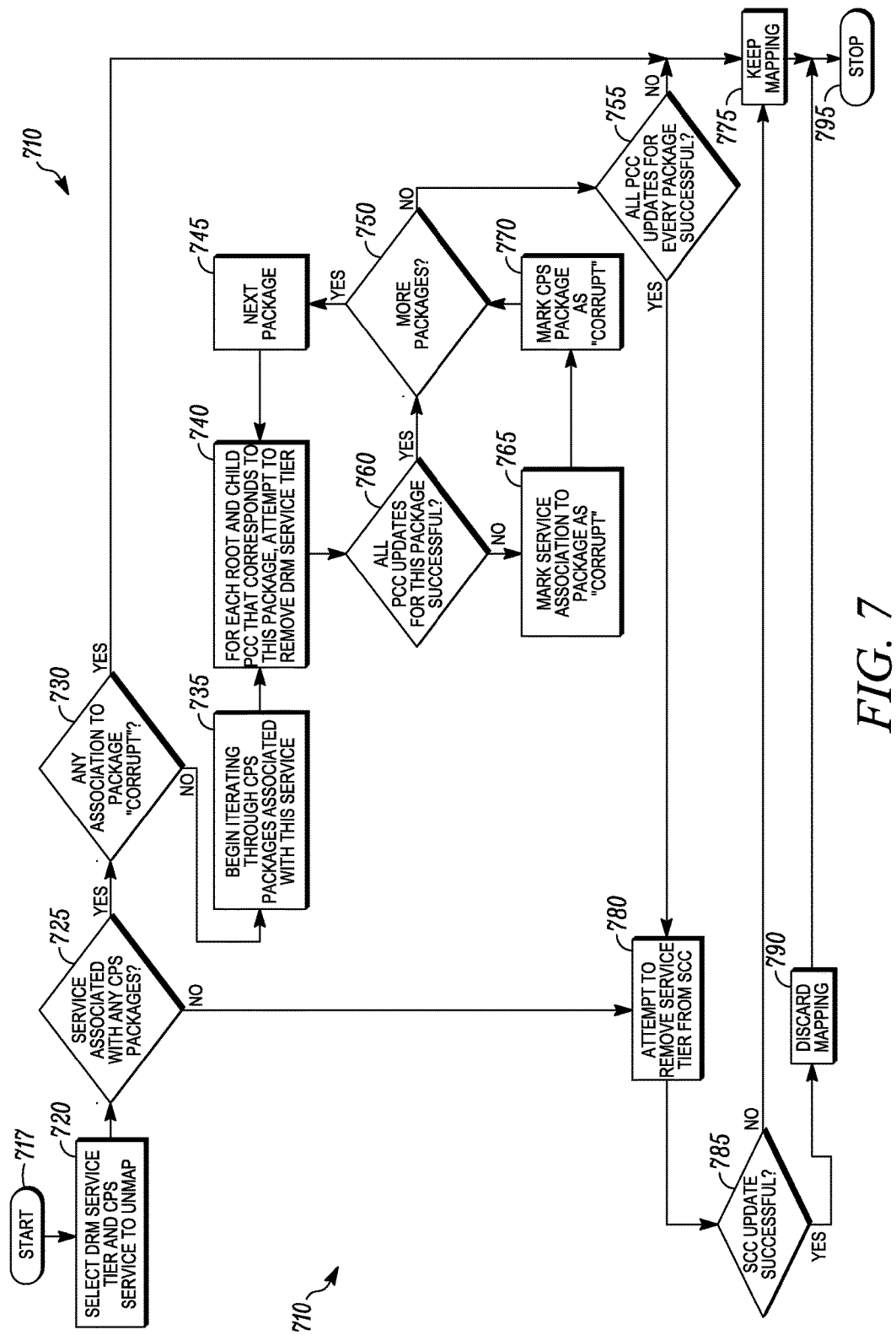
FIG. 7 depicts an example of unmapping a DRM service tier or level to a CPS service according to one embodiment.

FIG. 7 depicts an example process 710 of unmapping a DRM service tier or level to a CPS service according to one embodiment. In a first step 715, process 710 is initiated. At step 720, a DRM service level and CPS service are selected to unmap. At step 725, it is determined if the CPS service is associated with any CPS packages. If not, at step 780, the CPS attempts to remove the DRM service level from the SCC. Thereafter, at step 785, it is determined if the SCC update is successful. If the update is not successful, at step 775, the DRM service level mapping is kept. Thereafter, the process is terminated at step 795. If the update is successful, at step 790, the DRM service level mapping is discarded. Thereafter, the process is terminated at step 795.

Referring back to step 725, if it is determined that the CPS service is associated with one or more CPS packages, then at step 730, the CPS determines if any association to the CPS packages are corrupt. If an association is corrupt, then at step 775, the DRM service level mapping is kept. Thereafter, the process is terminated at step 795. If the associations are not corrupt, at step 735, the CPS begins iterating through CPS packages associated with the CPS service. At step 740, for each root and child PCC that corresponds to the CPS package, the CPS attempts to remove the DRM service level from the root or child PCC. At step 760, if all PCC updates for the CPS package are successful, the CPS checks for more CPS packages at step 750. If there are no more CPS packages, at step 755, the CPS determines if all PCC updates for the CPS package are successful. If all updates are successful, the CPS attempts to remove the DRM service level from the SCC at step 780. Thereafter, the sequence of steps after 780 may follow as described above. If all updates are not successful at step 755, then at step 775, the DRM service level mapping is kept. Thereafter, the process is terminated at step 795.

Referring back to step 760, if all PCC updates for the CPS package are not successful, the CPS marks the service association to the CPS package as corrupt at step 765. Thereafter, in step 770, the CPS marks the CPS package as corrupt. At step 750, the CPS checks for more CPS packages. Thereafter, the sequence of steps after 750 may follow as described above.

In FIG. 7, all PCC updates must succeed in order for the mapping to be discarded. If not all PCC updates succeed, the mapping persists, and one or more of the CPS service association(s) to packages become corrupt.

Figure 8:
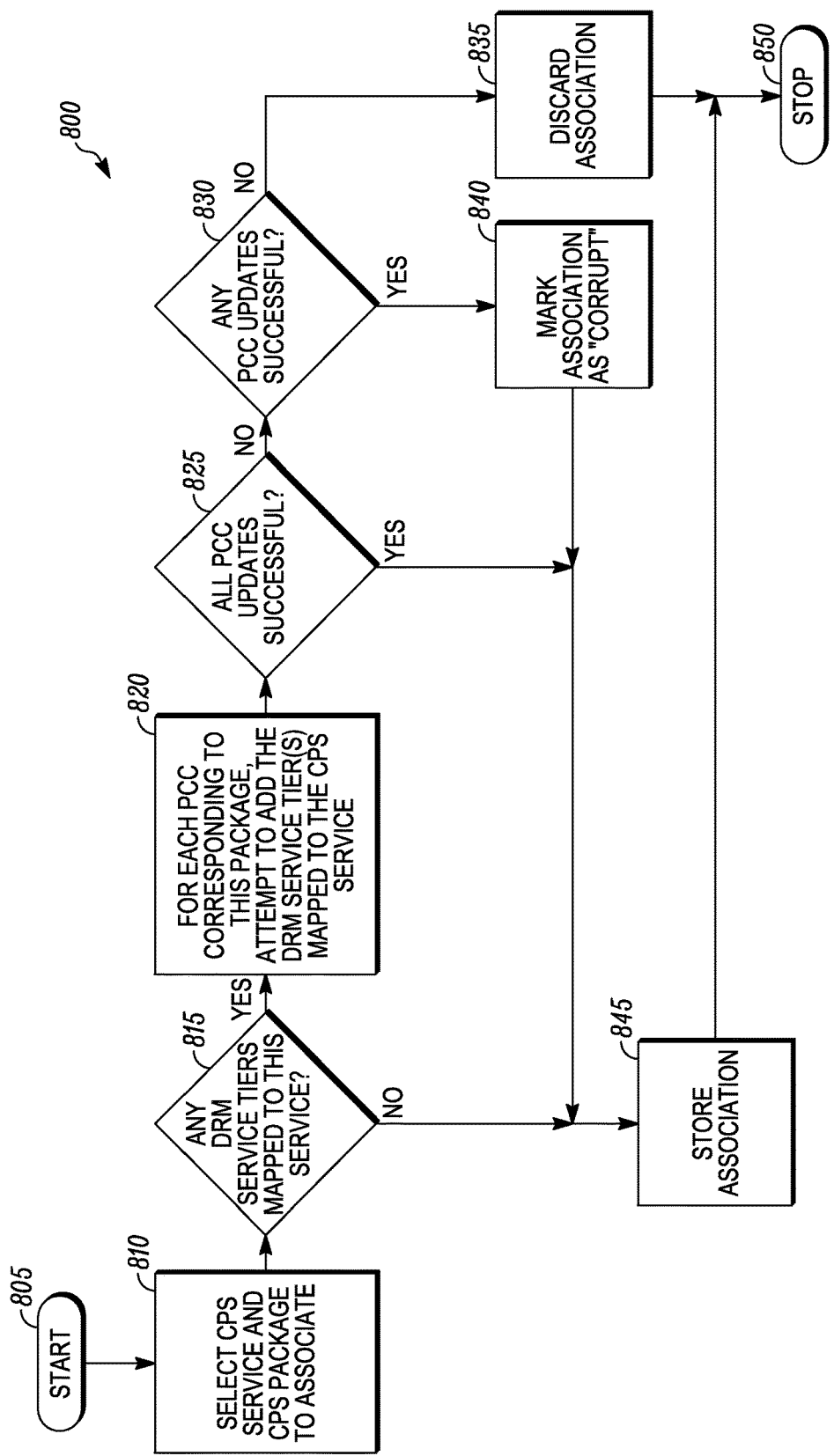
FIG. 8 depicts an example of associating a CPS service with a CPS package according to one embodiment.

FIG. 8 depicts an example process 800 of associating a CPS service with a CPS package according to one embodiment. In a first step 805, process 800 is initiated. At step 810, a CPS service and CPS package to associate are selected. At step 815, it is determined if any DRM service levels are mapped to this CPS service. If not, at step 845, the CPS service to CPS package association is stored. Thereafter, the process is terminated at step 850. If there are DRM service levels mapped to the CPS service, at step 820, for each PCC corresponding to the CPS package, the CPS attempts to add the DRM service levels mapped to the CPS service. At step 825, the CPS determines if all PCC updates are successful. If all updates are successful, at step 845, the CPS service to CPS package association is stored. Thereafter, the process is terminated at step 850. If not all updates are successful, the CPS determines if any PCC updates are successful at step 830. If at least one update is successful, the CPS marks the association as corrupt at step 840 and stores the CPS service to CPS package association at step 845. If no PCC updates are successful at step 830, at step 835, the CPS discards the association and the process is terminated at step 850.

In FIG. 8, association is only not stored if all attempts to update the requisite PCCs fail. In such a case, the CPS conclusively knows that the service is not included in the root package and every child package—meaning that no devices authorized for the package will receive this service as part of the package—and therefore, there is no point in keeping the association.

Figure 9:
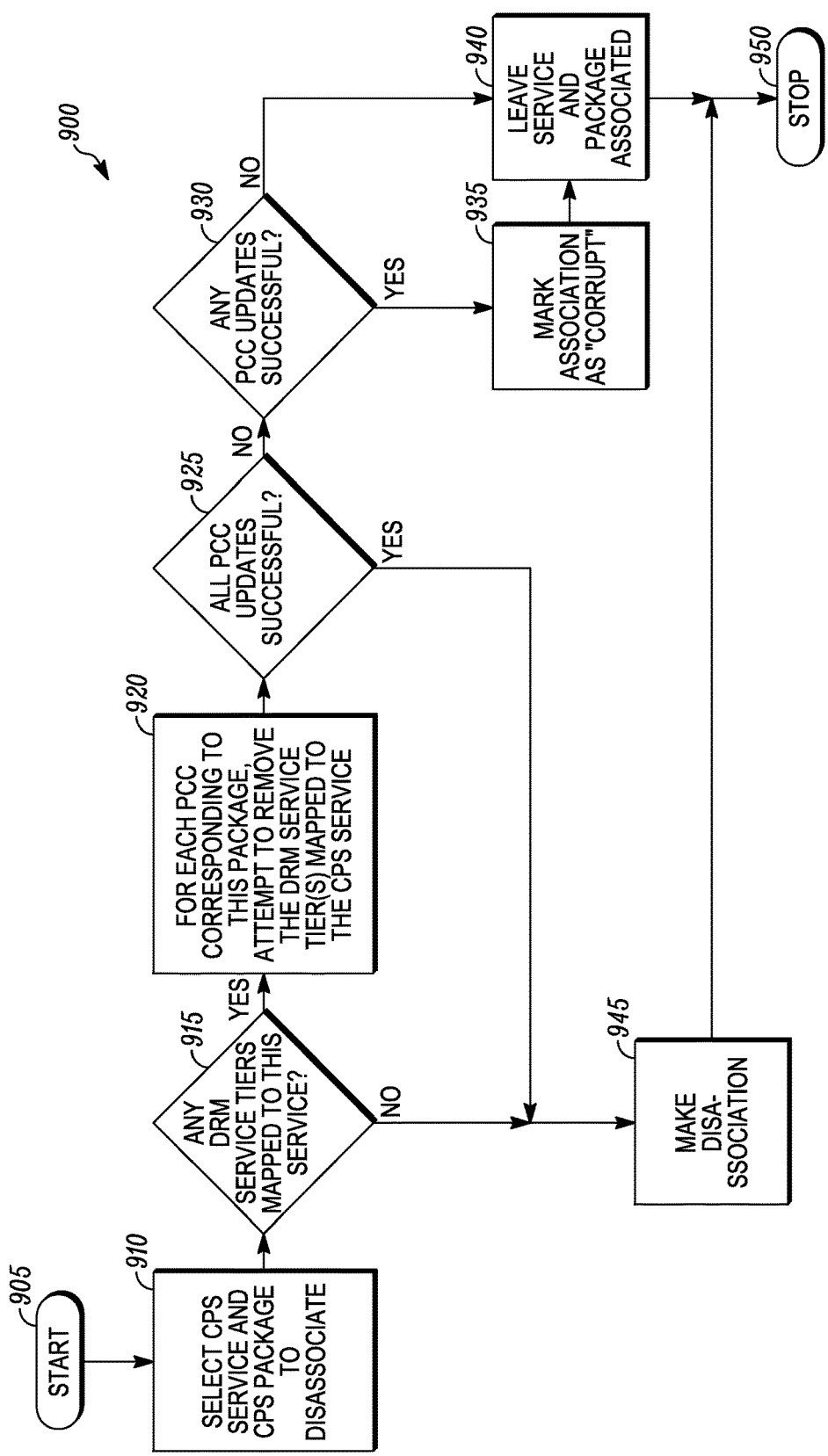
FIG. 9 depicts an example of disassociating a CPS service from a CPS package according to one embodiment.

FIG. 9 depicts an example process 900 of disassociating a CPS service from a CPS package according to one embodiment. In a first step 905, process 900 is initiated. At step 910, a CPS service and CPS package to disassociate are selected. At step 915, it is determined if any DRM service levels are mapped to this CPS service. If not, at step 945, the CPS service is disassociated from the CPS package. Thereafter, the process is terminated at step 950. If there are DRM service levels mapped to the CPS service, at step 920, for each PCC corresponding to the CPS package, the CPS attempts to remove the DRM service levels mapped to the CPS service. At step 925, the CPS determines if all PCC updates are successful. If all updates are successful, at step 945, the CPS service is disassociated from the CPS package. Thereafter, the process is terminated at step 950. If not all updates are successful, the CPS determines if any PCC updates are successful at step 930. If at least one update is successful, the CPS marks the association as corrupt at step 935 and leaves the CPS service associated with the CPS package at step 940. Thereafter, the process is terminated at step 950. If no PCC updates are successful at step 930, at step 940, the CPS leave the CPS service associated with the CPS package. Thereafter, the process is terminated at step 950.

In FIG. 9, the disassociation is only done if all attempts to update the requisite PCCs are successful. Otherwise, the association stays, and is considered "corrupt".

Figure 10:
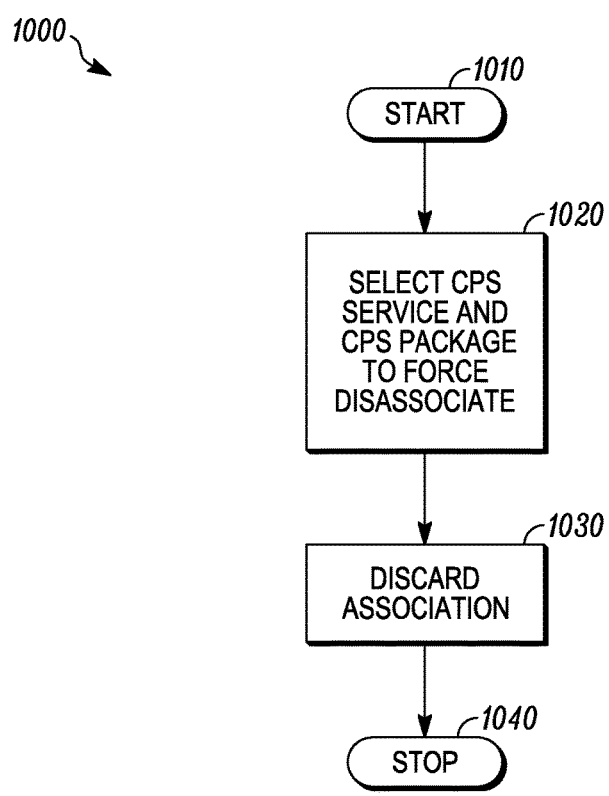
FIG. 10 depicts an example of a forced disassociation of a CPS service from a CPS package according to one embodiment.

FIG. 10 depicts an example process 1000 of a forced disassociation of a CPS service from a CPS package according to one embodiment. In a first step 1010, process 1000 is initiated. At step 1020, a CPS service and CPS package are selected to force disassociate. At step 1030, the association between the CPS service and CPS package is discarded. Thereafter, the process is terminated at step 1040.

In FIG. 10, there is no dependency/interaction/etc. with the DRM provider(s). A force-disassociate operation only impacts the content model in the CPS. The DRM providers may remain out-of-sync with the CPS until manually corrected by the MSO.

Figure 11:
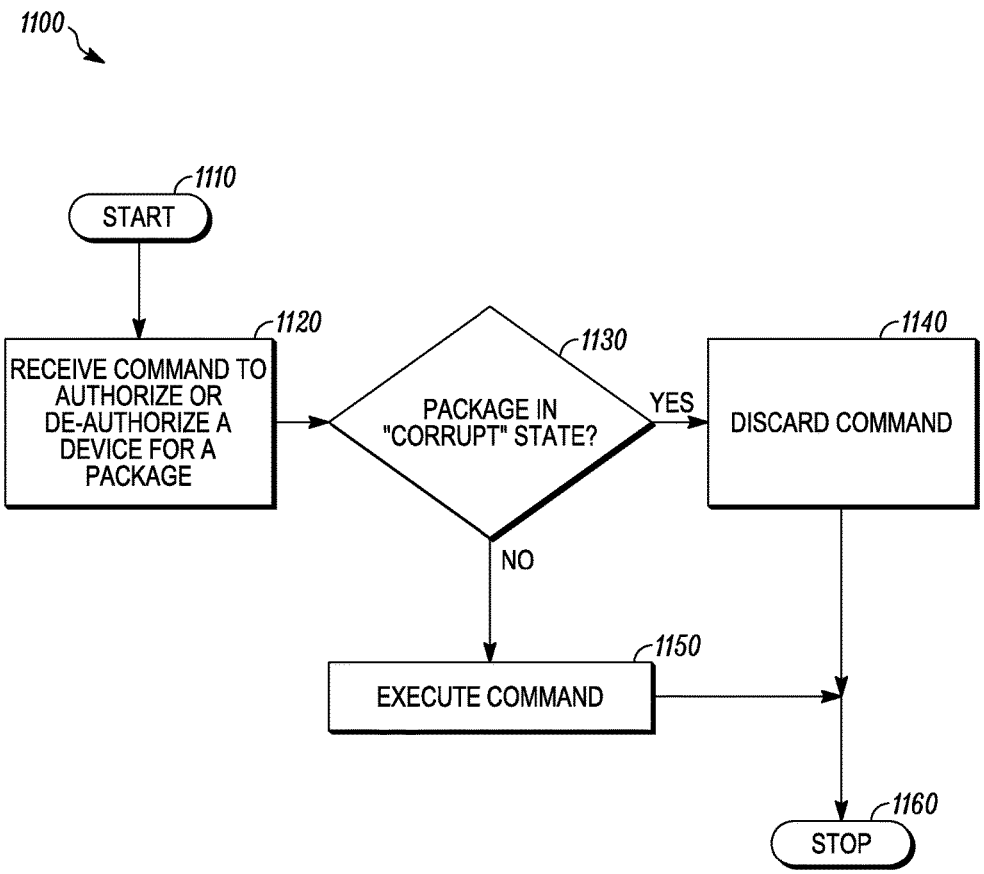
FIG. 11 depicts an example of changing an authorization state of a package on a device according to one embodiment.

FIG. 11 depicts an example process 1100 of changing an authorization state of a package on a device according to one embodiment. In a first step 1110, process 1100 is initiated. At step 1120, the CPS receives a command to authorize or de-authorize a device for a CPS package. At step 1130, the CPS determines if the CPS package is in a corrupt state. If the package is not corrupt, in step 1150, the CPS executes the command. Thereafter, the process is terminated at step 1160. If the package is corrupt, in step 1140, the CPS discards the command. Thereafter, the process is terminated at step 1160.

In FIG. 11, a package in the "corrupt" state cannot be newly-authorized on a device, and cannot be de-authorized from a device which is already authorized for it. However, a device that was authorized for the package before it entered the "corrupt" state will retain the authorization for the package.

Figure 12:
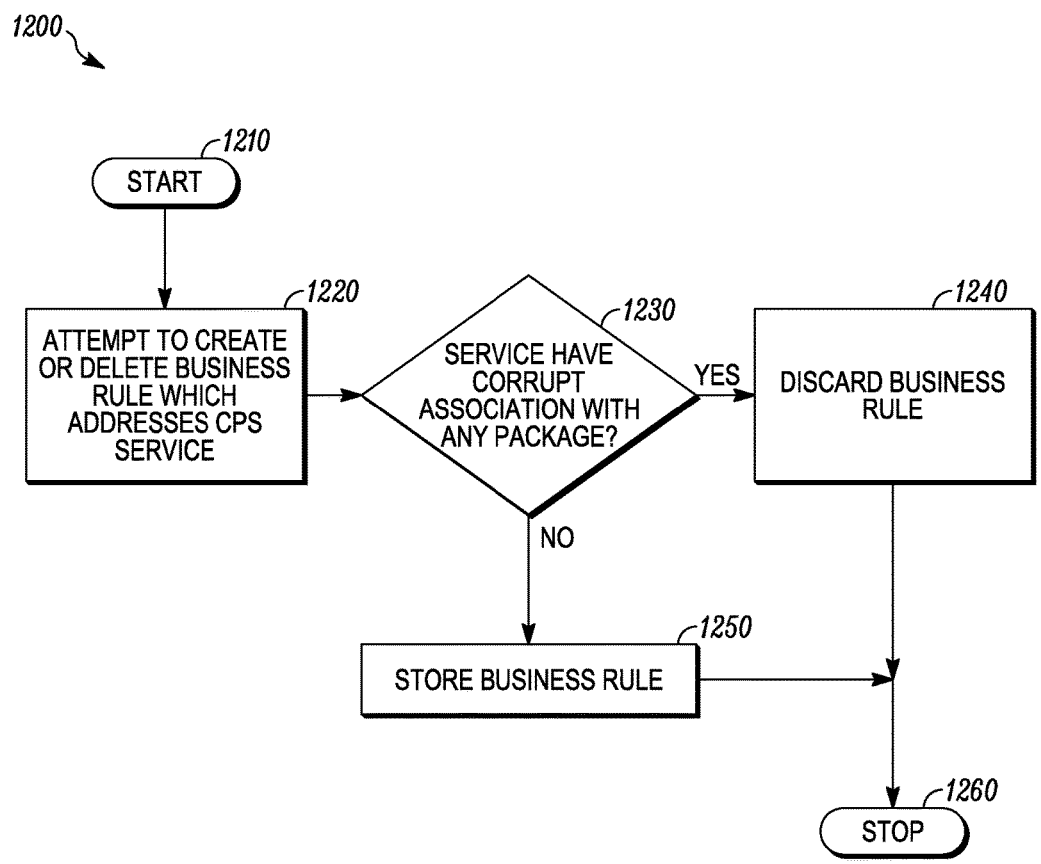
FIG. 12 depicts an example of updating a policy rule according to one embodiment.

FIG. 12 depicts an example process 1200 of updating a policy rule according to one embodiment. In a first step 1210, process 1200 is initiated. At step 1220, the CPS attempts to create or delete or update a policy rule that addresses a CPS package associated with a CPS service or CPS services directly. At step 1230, the CPS determines if the CPS service has a corrupt association with any CPS package. If not, in step 1250, the CPS stores the policy rule. Thereafter, the process is terminated at step 1260. If the CPS determines that the CPS service has had a corrupt association with any CPS package, in step 1240, the CPS discards the policy rule. Thereafter, the process is terminated at step 1260.

In FIG. 12, a policy rule that addresses a service with a corrupt association to a package cannot be changed. If the association cannot be corrected in the normal manner, a force-disassociation of the service must be done in order for the change to the policy rule to be permitted. Even though FIG. 12 only calls out the creation and deletion of a policy rule, the modification of a policy rule is covered as well, as it can be viewed as a combination of deletion and addition.

Benefits provided by the present disclosure may include:
- Can be used in a variety of networks which distribute video in a multitude of formats, e.g. linear MPEG services over QAM, linear multicast services over IP, download-based VOD streaming over IP, etc. This disclosure is relevant anywhere that content is managed and DRM is deployed.
- Can be used in a variety of headend configurations (legacy, IP, etc.). Possible headend environments are not limited to the examples shown e.g., the topology could differ, or there could be different systems driving the CPS.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

We claim:

1. A method of updating a common provisioning system (CPS) service, comprising:
    selecting a DRM (Digital Rights Management) service level from a DRM provider and a corresponding CPS service for said DRM service level, wherein the CPS service centrally controls content configuration constructs and device authorizations for all DRM providers using the CPS service;
    determining if the CPS service is associated with one or more CPS packages;
    for each associated CPS package, determining if the association is in a corrupt state, wherein the association is in a corrupt state if at least one package content collection (PCC) for the CPS package does not correctly include or exclude the DRM service level that corresponds to said CPS service; and
    for each associated CPS package in a non-corrupt state, updating a package content collection (PCC) in the DRM provider, and
    for each associated CPS package in a corrupt state, the DRM service level is not mapped to the CPS service associated with the CPS packages in the corrupt state.

2. The method of claim 1, wherein a service content collection (SCC) is updated if all associated CPS packages are in non-corrupt states.

3. The method of claim 1, wherein if zero CPS packages are in a corrupt state, mapping the DRM service level to the CPS service.

4. The method of claim 3, further comprising:
    storing an updated service content collection (SCC) as having an association to the DRM service level in the DRM provider.

5. The method of claim 4, further comprising:
    for each PCC that corresponds to a CPS package, initiating adding the DRM service level to each PCC in said DRM provider.

6. The method of claim 5, wherein if at least one PCC fails to add said DRM service level, identifying the CPS service association to CPS package as corrupt.

7. The method of claim 5, wherein if at least one PCC fails to add said DRM service level, identifying the CPS package as corrupt.

8. The method of claim 1, wherein if the CPS service is not associated with one or more CPS packages, initiating removal of the DRM service level from a service content collection (SCC) of the CPS service.

9. The method of claim 1, wherein for each PCC that does not correctly include or exclude the DRM service collection that corresponds to said CPS service, initiating removal of the DRM service level from the PCC.

10. The method of claim 9 wherein if at least one PCC fails to delete the DRM service level, identifying the CPS service association to CPS package as corrupt.

11. The method of claim 9, wherein if at least one PCC fails to delete the DRM service level, identifying the CPS package as corrupt.

12. The method of claim 9, wherein the DRM service level is mapped to the CPS service, the method further comprising:
    discarding mapping of the DRM service level to CPS service.

13. The method of claim 9, wherein the DRM service level is mapped to the CPS service, the method further comprising:
    retaining mapping of the DRM service level to CPS service.

14. The method of claim 1, further comprising:
    providing the DRM service level to one or more devices, wherein if a CPS package is in a non-corrupt state, executing a command to authorize or deauthorize the CPS package in the one or more devices.

15. The method of claim 1, further comprising:
    updating a policy rule for the CPS service,
    wherein if a CPS service is associated with one or more CPS packages in a noncorrupt state, storing the policy rule, and
    wherein the policy rule is stored if the CPS service is associated with zero CPS packages in a corrupt state.

* * * * *